United States Patent [19]

Murphy et al.

[11] Patent Number: 4,887,523
[45] Date of Patent: Dec. 19, 1989

[54] SHISH-KAKOB COOKING DEVICE

[76] Inventors: Willard J. Murphy; Shirley G. Murphy, both of Highway 25, Box 642, Monticello, Minn. 55362

[21] Appl. No.: 173,172

[22] Filed: Mar. 24, 1988

[51] Int. Cl.$^4$ ................................................ A47J 37/04
[52] U.S. Cl. .......................................... 99/419; 99/421; 99/444; 206/562; D7/359; D7/27
[58] Field of Search ............ 99/419, DIG. 14, 421 V, 99/421 A, 421 HV, 426, 422, 444, 446, 448, 410, 416, 339, 375, 400, 425; 126/390, 400; 426/243, 242; 219/10.55 E; 206/562, 564; 220/1 C; 211/60.1; 17/1 R, 1 S; D7/27, 357, 359

[56] References Cited

U.S. PATENT DOCUMENTS

| | | | |
|---|---|---|---|
| D. 260,221 | 8/1981 | Lee | D7/359 |
| 1,339,625 | 5/1920 | Holloway | 99/419 X |
| 1,915,214 | 6/1933 | Caldwell | D7/27 X |
| 2,590,470 | 3/1952 | Skocic | 99/421 V |
| 2,770,957 | 11/1956 | Bronson | D7/27 X |
| 4,076,116 | 2/1978 | Sowders | 99/419 X |
| 4,176,592 | 12/1979 | Doyle | 99/419 |
| 4,294,865 | 10/1981 | Coroncos | 99/419 X |
| 4,366,750 | 1/1983 | Brown | 99/448 X |
| 4,558,197 | 12/1985 | Wyatt | 99/419 X |
| 4,589,333 | 5/1986 | Murphy | 99/419 |

FOREIGN PATENT DOCUMENTS 833677  2/1952  Fed. Rep. of Germany ... 99/421 V

Primary Examiner—Philip R. Coe
Assistant Examiner—K. O'Leary
Attorney, Agent, or Firm—Andrus, Sceales, Starke & Sawall

[57] ABSTRACT

A shish-kabob baking device that comprises a base unit having at least one vertical hole to receive the lower end of a skewer containing chunks of various food products. The base unit includes a trough or depression and a drain means connects the lower end of each hole to the trough. During baking, any grease, juices or other liquids generated from the baking of the food products, will flow downwardly over the food products and be collected in the trough.

9 Claims, 2 Drawing Sheets

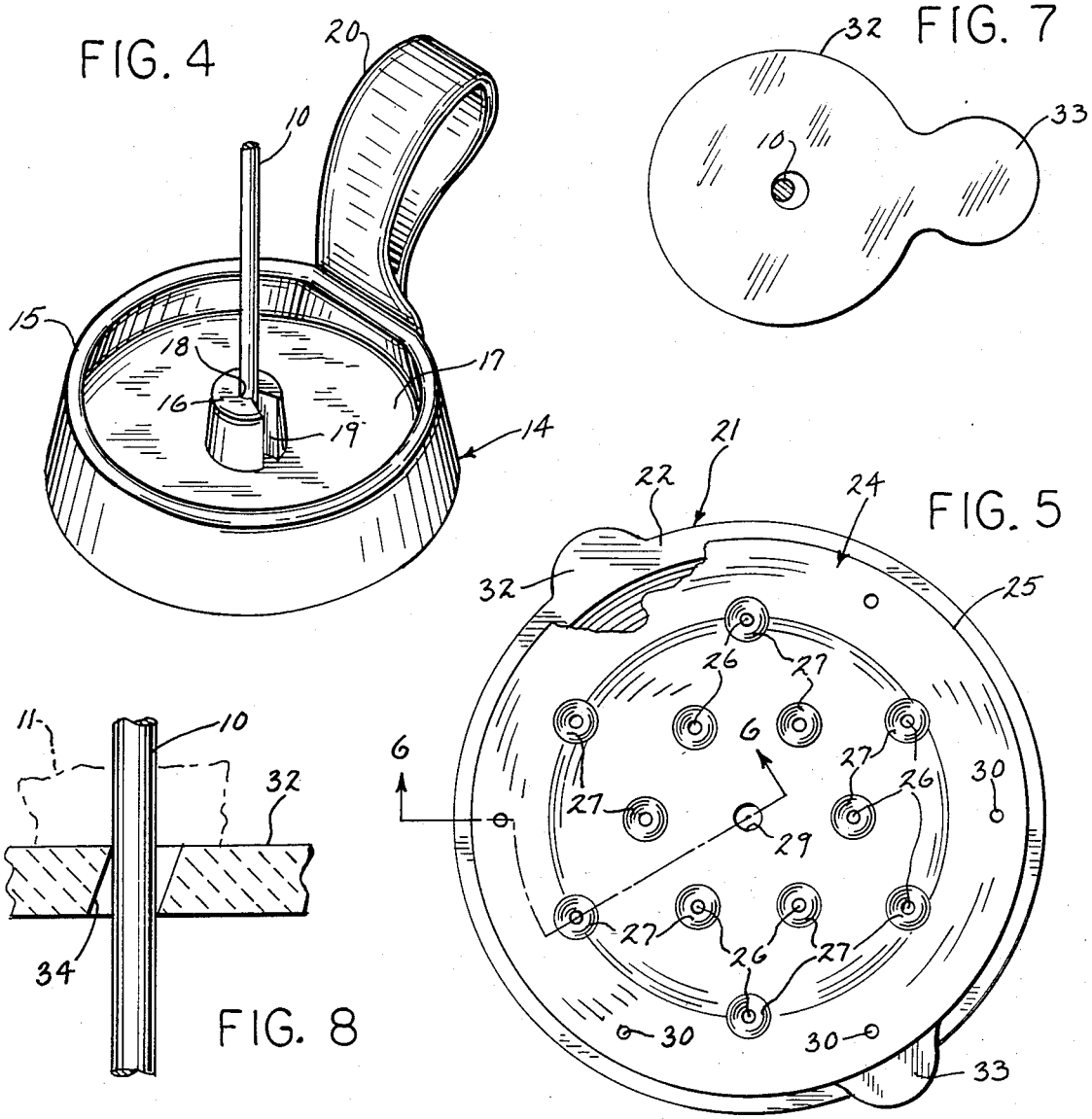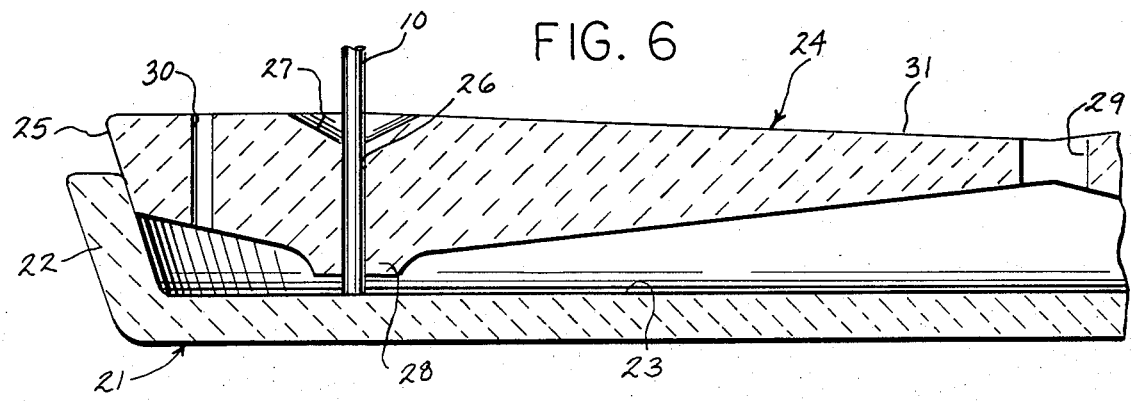

SHISH-KAKOB COOKING DEVICE

BACKGROUND OF THE INVENTION

In shish-kabob cooking, various food products, such as chunks of meat, potatoes, vegetables, and fruits are impaled on a skewer. It is desirable to mount the skewer vertically during cooking in order that the grease and juices eminating from the food products being cooked, as well as any applied sauces, will flow downwardly over the food products to enhance the flavor. In addition, the vertical orientation also prevents grease from dripping onto the heating source.

Shish-kabob cooking devices, in general, are designed for outdoor use and the heating source can be either charcoal, gas or electric heating elements. In general, the shish-kabob cooking devices are fairly large and not adapted for indoor usage. Thus, there has been a need for a smaller unit that can be used to cook shish-kabob in a household oven, and/or to serve shish-kabob to a diner.

SUMMARY OF THE INVENTION

The invention is directed to a device that can be used to cook shish-kabob and to serve the cooked shish-kabob at the table. The device comprises a base having at least one vertical hole to receive the bottom end of a skewer containing the impaled chunks of food products. The base includes a trough or depression and a drainage system connects the lower ends of the holes with the trough so that during baking, grease, juices or other liquids eminating from the cooking process, will be drained into the trough for collection.

In one form of the invention, the base includes a plurality of concentric annular ridges and the area or space between the ridges define troughs. A plurality of holes are formed in each ridge and are arranged in a circular pattern. The ridges are provided with slits establish communication between the holes and the troughs to provide drainage for the liquids.

In a second form of the invention, the base includes an upstanding peripheral flange and a central projection which contains a single hole to reeeive a skewer containing the food products. As in the first embodiment, a slit is formed in the projection to provide a drainage passage between the hole and the trough, which is located between the projection and the peripheral flange.

In a further modified form of the invention, the base unit includes a lower drip tray having an upstanding peripheral flange and a separate base member which is supported on the tray. The base member is formed with a plurality of holes to receive the lower ends of skewewrs containing the food products, and the holes extend through the base and communicate with the drip tray. In addition, the base member is formed with a plurality of drain openings and the upper surface of the base member slopes toward the openings. During cooking, grease and other liquids will flow through the holes, as well as through the drain openings, for collection in the drip tray.

The invention provides a compact, inexpensive shish-kabob cooking divide that can be used in a household oven and does not require any auxiliary heat source.

After baking, the entire device can be placed on the dining table so that the skewers can be maintained in the vertical orientation until removed by the diner. Alternately, the device can be used to serve shish-kabob to the table after being cooked on an outdoor grill or cooker.

The skewers are held in a vertical orientation which permits grease, juices and other flavoring agents to flow downwardly over the food product for collection in the trough. As drain passages are connected to the bottom of the holes that receive the skewers, minimal liquid is collected in the holes which facilitates cleaning of the device.

Other objects and advantages will appear in the course of the following description.

DESCRIPTION OF THE DRAWINGS

The drawings illustrate the best mode presently contemplated of carrying out the invention.

In the drawings:

FIG. 4 is a perspective view of a modified form of the invention utilizing a single skewer;

FIG. 5 is a plan view of a modified form of the invention with parts broken away in section;

FIG. 6 is a section taken along line 6—6 of FIG. 5; and

FIG. 7 is a plan view of a food support and skewer; and

FIG. 8 is a section taken along line 8—8 of FIG. 7.

DESCRIPTION OF THE ILLUSTRATED EMBODIMENT

Figure 1:
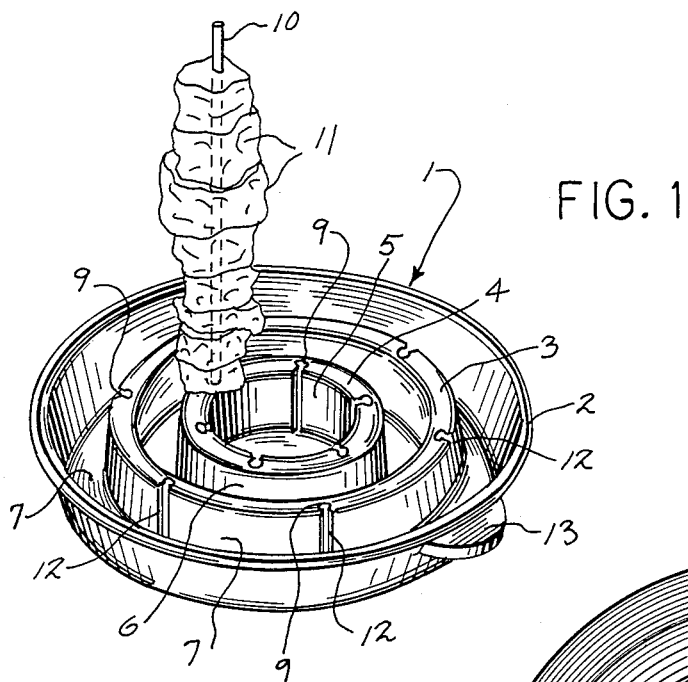
FIG. 1 is a perspective view of the shish-kabob cooking device of the invention.
Figure 2:
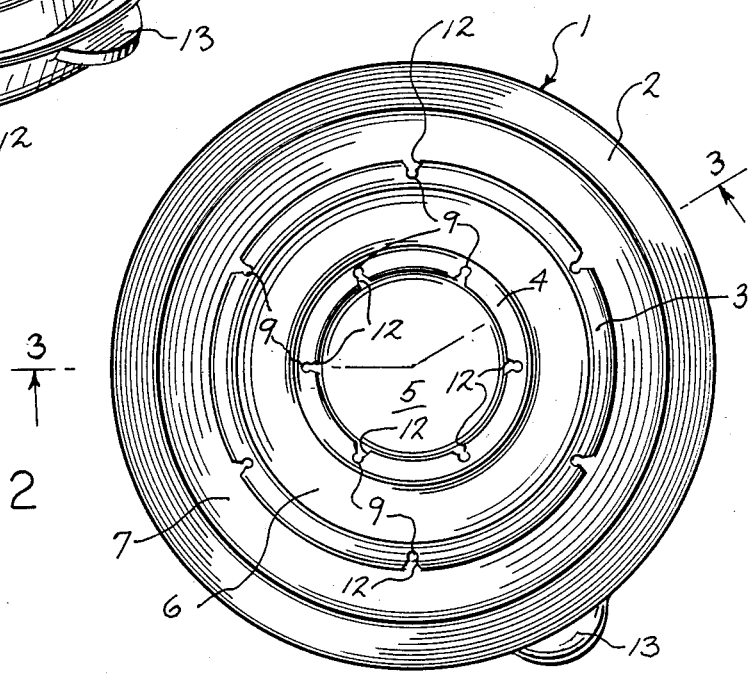
FIG. 2 is a top plan view of the device shown in FIG. 1.
Figure 3:
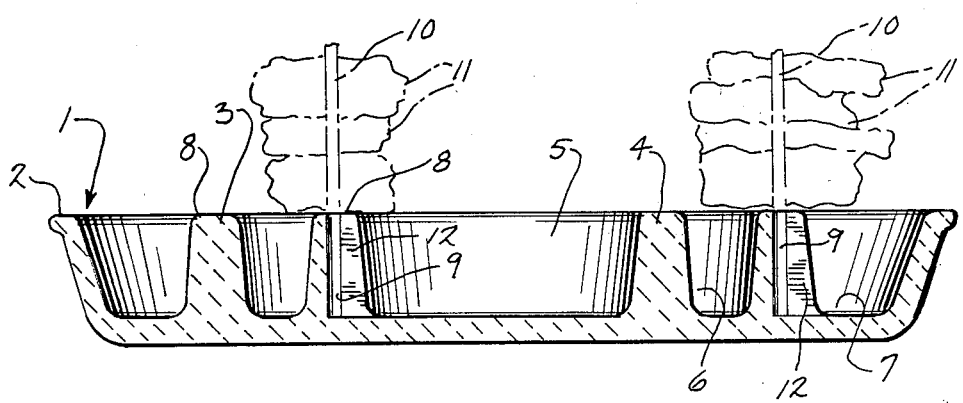
FIG. 3 is a section taken along line 3—3 of FIG. 2.

FIGS. 1-3 illustrate a shish-kabob cooking device comprising a base or dish 1 formed of a heat resistant material, such as ceramic. Base 1 is formed with an upstanding peripheral flange 2 and a pair of concentric spaced upwardly extending ridges 3 and 4, which, with the flange 2, define a central trough 5 and annular troughs 6 and 7. The upper extremities of ridges 3 and 4 are generally rounded as indicated by 8.

Each ridge 3 and 4 contains a plurality of holes 9 have closed bottoms and which are arranged in a generally circular pattern. Holes 9 are adapted to receive the lower blunt end of a skewer 10 which contains chunks 11 of food products.

The skewers are preferably circular in cross-section and complement the circular holes 9. In practice, the skewers are generally formed of wood, although metal skewers can also used.

Various foods 11 can be impaled on the skewers such as, chunks of meat, potatoes, tomatoes, onions, fruit, cheese and the like. In addition, flavoring sauces can be applied to the food chunks 11.

The shish-kabob unit containing skewers 10 in a generally vertical orientation, can be placed in a household oven for cooking. During baking, grease, juice or seasoning sauces will flow downwardly over the foods chunks 11 and will be deflected by the rounded ends 8 of ridges 3 and 4 into troughs 5, 6 and 7.

In addition, ridges 3 and 4 are provided with slits 12 which establish communication between each hole 9 and the troughs 5 and 7. As best shown in FIG. 3, slits 12 extend the entire heighth of the holes 9, and the slits are provided with diverging walls, which diverge outwardly from the hole toward the respective trough as illustrated in FIG. 2. In addition, the bottom of each slit or passage 12 can be inclined downwardly toward the respective trough to aid in draining any liquid from the holes 9.

A hanlde 13 can be formed integrally with the base 1 to aid in carrying or otherwise handling the base.

In use, the chunks of food chunks or pieces 11 are placed on the skewers 10 and the base or blunt end of each skewer is then inserted in one of the holes 9 with the end of the skewer resting on the bottom of the hole.

The device is then placed in an oven for baking and during baking any liquids such as grease, juice or sauces that flow downwardly over the food products, are collected in the troughs 5, 6 and 7. In addition, the slits or passages 12 aid in draining any liquids from the holes 9 into the troughs so that any collection of liquid in the holes is minimal. This substantially facilitates cleaning of the device after usage.

FIG. 4 shows a modified form of the invention which is adapted to support a single skewer. The shish-kabob unit as illustrated in FIG. 4 includes a cup-like, heat resistant, base 14 having an upwardly extending peripheral flange 15. A projection 16 is located centrally of the base and the area 17 between the projection 16 and flange 15 defines a collection trough.

A single vertical hole 18 is formed in projection 16 to receive a skewer 10 containing food products, not shown in FIG. 4. To facilitate drainage of liquids from the hole 18, tapered slit 19, similar in structure and function to slits 12 of the first embodiment, provides communication between the hole 18 and trough 17.

A handle 20 can be integrally formed with the base 14 to facilitate carrying or handling of the device.

The single skewer unit, as illustrated in FIG. 4, can be employed to provide an individual shish-kabob for each diner or can be used to cook desserts such as, Baked Alaska.

The food chunks 11 can be held on the skewer to prevent the food chunks from sliding downwardly during baking by holders of the type described in U.S. Pat. No. 4,589,333.

FIGS. 5 and 6 illustrate a further modified form of the invention, in which the device includes a tray 21 formed of heat resistant material, such as ceramic, and having an upwardly projecting peripheral flange 22 and a generally flat bottom surface 23. Supported by tray 21, is a base member 24 formed of ceramic or other heat resistant material. Base member 24 includes an inclined peripheral edge 25 which nests against the complementary inclined inner surface of flange 22 of tray 21.

Base member 24 is formed with a plurality of holes 26, which as illustrated, are in circular concentric patterns. However, it is contemplated that the base member can be formed with at least one hole, and the holes can be arranged in any desired pattern.

As illustrated in FIG. 6, a tapered or inclined well 27 communicates with the upper end of each hole 26, and the lower ends of the holes 26 extend through a generally annular ridge 28 which extends downwardly from base member 24. The inclined peripheral edge 25 of base member 24 is constructed and arranged with respect to the flange 22, so that when the base member 24 is nested within tray 21, the lower surface of the ridge 28 will be spaced above bottom surface 23 to provide drainage between the holes 26 and the drip tray 21 for collection of liquids.

As previously described, the lower ends of skewers 10 containing food chunks 11, are inserted within the holes 26 for baking.

To provide additional drainage, base member 24 is provided with a central drain opening 29 and a plurality of drain holes 30 which are located adjacent the peripheral edge of the base member. The upper surface 31 of base member 24 is contoured so that the surface will slope toward the drain openings 29 and 30 to permit the liquids to flow through the drain openings into the drip tray.

To facilitate handling, both the tray 21 and base member 24 are provided with handles 32 and 33 respectively.

The device shown in FIGS. 5 and 6 has the advantage that the base member 24 containing the skewers, can be completely removed from the drip tray 21 and placed on the dining table, thereby eliminating any problem of possible grease spillage. In an alternate form, the device can be used to serve shish-kabob that was cooked on an auxilliary cooking device.

FIGS. 7 and 8 show a food support 32, which is adapted to be associated with a skewerr 10 to hold the food products 11 on the skewer and prevent the food products from slipping downwardly. When some food products are impaled by a skewer, they will not firmly adhere to the skewer, and accordingly, the support 32 is employed during cooking and handling of the food products.

The support 32 is preferably made out of plastic material and has particular application for cooking the food products in a microwave oven. The support includes an outwardly extending extension 33 which serves as a handle and an opening 34 extends through the support, with the axis of the opening, as shown in FIG. 8, being at an acute angle to the upper and lower surfaces of the support. With this construction, the skewer 10 is inserted through the opening with the axis of the skewer being parallel to the axis of the opening. When the support 32 is at the desired position along the length of the skewer, the support is tilted relative to the skewer relative to FIG. 8 so that the support extends normal or perpendicular to the skewer and the skewer is engaged with opposed edges of the opening as shown in FIG. 8. This arrangement will lock the support 32 at any desired position along the length of the skewer 10.

Various modes of carrying out the invention are contemplated as being within the scope of the following claims particularly pointing out and distinctly claiming the subject matter which is regarded as the invention.

I claim:

1. A cooking dish construction for supporting a food product in an auxiliary heating apparatus, comprising a dish including a base and having a ridge extending upwardly from said base, trough means disposed above said base and laterally of said ridge, said ridge having at least one vertical hole having a closed bottom, drain passage means extending laterally of the axis of said hole through said ridge and providing communication between said hole and said trough means, and a skewer freely disposed within said hole and containing a food product whereby drippings from said food product will flow downwardly along said skewer to said hole.

2. The construction of claim 1, wherein said drain passage means comprises a vertical slit in said ridge, said slit extending the full height of said hole.

3. The construction of claim 2, wherein said slit is bordered by a pair of generally vertical walls which diverge outwardly in a direction from said hole toward said trough means.

4. The construction of claim 1, wherein said trough means is annular in shape and surrounds said ridge.

5. The construction of claim 1, wherein said ridge is annular in configuration and contains a plurality of vertical holes spaced along the crown of said ridge.

6. The dish construction of claim 1, wherein the bottom of said trough means is at substantially the same vertical level as the bottom of said hole.

7. The dish construction of claim 1, wherein said dish is formed of a material selected from material groups consisting of wood and ceramic.

8. A dish construction for cooking a food product, comprising a base, an outer-ridge extending upwardly from the periphery of said base, an inner ridge spaced inwardly of said outer ridge with the space between said inner and outer ridges defining a trough, at least one vertical hole provided in the inner ridge, said hole having a closed bottom, drain passage means extending radially of said hole through said inner ridge and providing communication with said hole for draining liquids generated by cooking of said food product into said trough, and a skewer freely disposed within the hole and having a lower end supported on said bottom, said skewer adapted to support a food product, said dish being adapted to be placed in a cooking apparatus to cook said food product.

9. The construction of claim 8, wherein said ridges are annular in shape and said inner ridge surrounds a second trough.

* * * * *